United States Patent [19]

Higashimoto

[11] Patent Number: 5,323,694
[45] Date of Patent: Jun. 28, 1994

[54] RAW MEAT MASSAGING APPARATUS

[75] Inventor: Tsuyoshi Higashimoto, Ikoma, Japan

[73] Assignee: Higashimoto Kikai Co., Ltd., Ikoma, Japan

[21] Appl. No.: 77,016

[22] Filed: Jun. 14, 1993

[30] Foreign Application Priority Data

Jun. 15, 1992 [JP] Japan .................... 4-181698

[51] Int. Cl.⁵ .............. A22C 9/00; A22C 17/00; A23L 1/31; A23L 3/34
[52] U.S. Cl. ..................... 99/535; 99/472; 99/487; 366/139; 366/185; 366/233; 366/239
[58] Field of Search ................ 99/487, 532, 533, 535, 99/516, 472, 486, 494; 366/139, 55, 219, 220, 225, 233, 237, 235, 239, 187, 240, 188, 185, 227, 228, 601; 69/30

[56] References Cited

U.S. PATENT DOCUMENTS

| 296,251 | 4/1884 | Timby | 366/185 |
|---|---|---|---|
| 2,630,301 | 3/1953 | Lentz | 366/233 |
| 2,767,971 | 10/1956 | Hofmeister et al. | 366/233 |
| 3,880,067 | 4/1975 | Hoffman | 99/472 |
| 4,208,135 | 6/1980 | Bastiao | 366/239 |
| 4,501,499 | 2/1985 | Boan et al. | 366/185 |
| 4,517,888 | 5/1985 | Gould | 99/535 |
| 4,520,718 | 6/1985 | Prosenbauer | 99/535 |
| 4,791,705 | 12/1988 | Corominas | 99/472 |
| 4,836,099 | 6/1989 | Thirode | 99/472 |
| 4,881,458 | 11/1989 | Higashimoto | 99/533 |
| 4,951,261 | 8/1990 | Strehlow | 366/185 |
| 5,104,232 | 4/1992 | Lennox, III | 366/139 |

FOREIGN PATENT DOCUMENTS 0127608 12/1984 European Pat. Off. .
2811584 9/1979 Fed. Rep. of Germany ...... 366/185
0455611 11/1991 PCT Int'l Appl. .
1232905 5/1971 United Kingdom .
WO8908982 10/1989 World Int. Prop. O. .

OTHER PUBLICATIONS

Patent Abstracts of Japan, vol. 010, No. 383, Dec. 23, 1986.
Soviet Inventions Illustrated, Section Ch, Week 8249, Derwent Publications Ltd., Feb. 7, 1982.

Primary Examiner—Timothy F. Simone
Attorney, Agent, or Firm—Kirschstein, Ottinger, Israel & Schiffmiller

[57] ABSTRACT

According to the invention, there is provided a raw meat massaging apparatus including a container adapted to be charged with raw meat having a pickle solution injected thereinto, the container having the shape of rotary body. A frame extends longitudinally of the container, the container being supported by the frame for rotation about the longitudinal axis of the container. The frame includes container drive means for rotating the container about the longitudinal axis thereof for massaging, mixing and salting the raw meat. The frame is the type of a seesaw supported on a support means for rockingly movement thereabout, the support means extending substantially horizontally and widthwise of the frame and the container. The massaging apparatus further includes frame drive means operatively connected to the frame to rockingly move the frame and the container in a direction about the support means and in the reverse direction about the support means so that the frame and the container can be inclined into an oblique position with respect to a horizontal position and into the reversely oblique position with respect to the horizontal position.

5 Claims, 3 Drawing Sheets

RAW MEAT MASSAGING APPARATUS

FIELD OF THE INVENTION

The invention relates to a raw meat massaging apparatus for massaging, mixing and salting raw meat having pickle solution injected thereinto.

PRIOR ART

In the manufacturing process of ham and the like, there has been generally used a raw meat massaging apparatus including a container adapted to be charged with raw meat having a pickle solution injected thereinto, as disclosed in U.S. Pat. No. 3,880,067. The container has the shape of a rotary body, the container being tilted to be rested on rollers which are mounted on a frame. The container is rotated about the longitudinal axis thereof by the rollers for massaging, mixing and salting the raw meat. The container is movable along a floor.

However, the massaging apparatus has a problem that a portion of the raw meat may stay and stagnate at a certain position in the container for some reason when the container is rotated. The stagnant portion of the raw meat can not be effectively massaged, mixed and salted, resulting in low quality of the product.

SUMMARY OF THE INVENTION

It is an object of the invention to provide a novel and improved raw meat massaging apparatus in which all the raw meat flows and circulates in a container without stagnation so that all the raw meat effectively massaged, mixed and salted, resulting in high quality of a product.

According to the invention, there is provided a raw meat massaging apparatus including a container adapted to be charged with raw meat having a pickle solution injected thereinto, the container having the shape of rotary body. A frame extends longitudinally of the container, the container being supported by the frame for rotation about the longitudinal axis of the container. The frame includes container drive means for rotating the container about the longitudinal axis thereof for massaging, mixing and salting the raw meat.

The frame is the type of a seesaw supported on a support means for rocking movement thereabout, the support means extending substantially horizontally and widthwise of the frame and the container. The massaging apparatus further includes frame drive means operatively connected to the frame to rockingly move the frame and the container in a direction about the support means and in the reverse direction about the support means so that the frame and the container can be inclined into an oblique position with respect to a horizontal position and into the reversely oblique position with respect to the horizontal position.

In a preferred embodiment, the support means is positioned substantially intermediately of the length of the frame and the container. The container includes blade means formed on the inner surface thereof, the blade means extending spirally about the longitudinal axis of the container.

The frame has the shape of a hollow body including a cavity formed therein and rollers installed therein for rotation. The container is received in the cavity and rested on the rollers. The container drive means comprises a motor installed in the frame and operatively connected to the rollers for rotatingly driving the rollers so that the container is rotated about the longitudinal axis thereof by the rollers. The frame further includes the opposite opening ends in the longitudinal direction thereof, one of the opening ends comprising an inlet end adapted to receive the raw meat and direct the same into the container. The other opening end comprises an outlet end from which the raw meat is discharged after massaging, mixing and salting the raw meat. The inlet and outlet ends are closed by covers. The container also includes the opposite opening ends in the longitudinal direction which are communicated with the inlet and outlet ends respectively.

In another embodiment, the rollers are installed on the frame for rotation, the container being rested on the rollers. The container drive means comprises a motor installed on the frame and operatively connected to the rollers for rotatingly driving the rollers so that the container is rotated about the longitudinal axis thereof by the rollers. The container includes the opposite opening ends in the longitudinal direction thereof, one of the opening ends comprising an inlet end adapted to receive the raw meat and direct the same into the container. The other opening end comprises an outlet end from which the raw meat is discharged after massaging, mixing and salting the raw meat. The inlet and outlet ends are closed by covers.

A raw meat massaging apparatus embodying the invention is hereinafter described, by way of example, with reference to the accompanying drawings.

DETAILED DESCRIPTION OF THE PREFERRED EMBODIMENT

Figure 1:
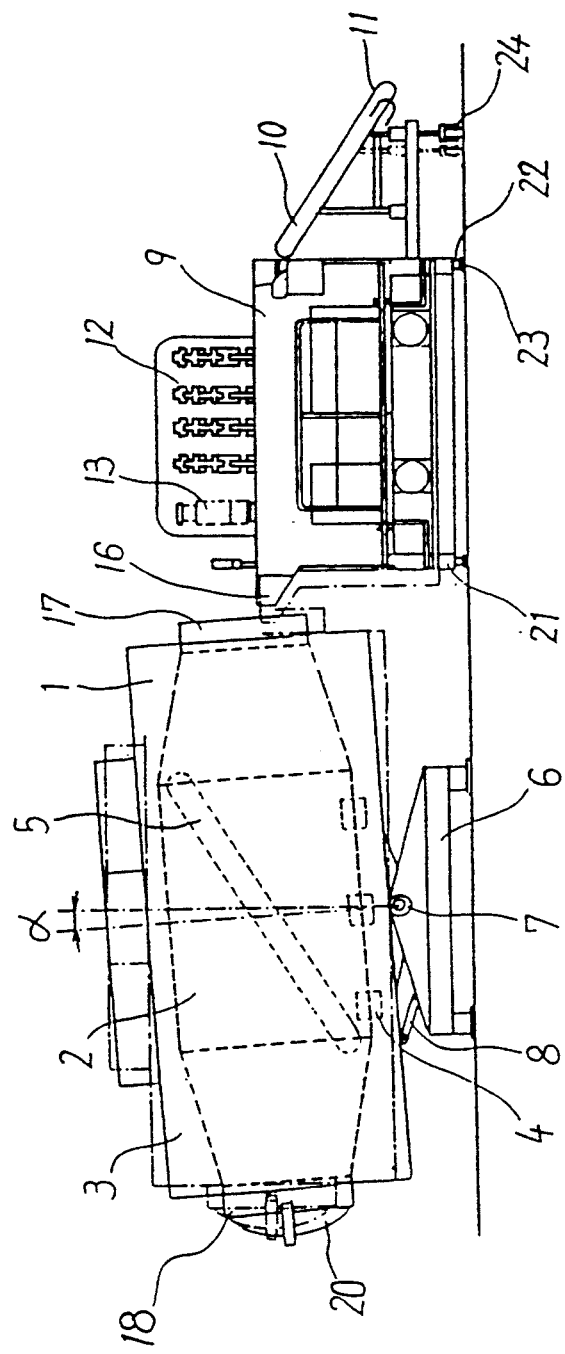
FIG. 1 is a side view of a preferred embodiment of the invention.

Referring to FIG. 1, a raw meat massaging apparatus 1 according to the invention is shown. The massaging apparatus 1 includes a container 2 adapted to be charged with raw meat having a pickle solution injected thereinto. The container 2 has the shape of a rotary body, like the container disclosed in U.S. Pat. No. 3,880,067. A frame 3 extends longitudinally of the container 2. The container 2 is supported by the frame 3 for rotation about the longitudinal axis of the container 2. In the embodiment, the frame 3 has the shape of a hollow body including a cavity formed therein and rollers 4 installed therein for rotation, the container 2 being received in the cavity and rested on the rollers 4. The frame 3 includes container drive means comprising a motor not shown. The motor is installed in the frame 3 and operatively connected to the rollers 4 for rotatingly driving the rollers 4 so that the container 2 is rotated about the longitudinal axis thereof by the rollers 4 for massaging, mixing and salting the raw meat. In addition, the container 2 includes a plurality of blades 5 formed on and angularly spaced to each other along the inner surface thereof, the blades 5 extending spirally about the longitudinal axis of the container 2.

The frame 3 is the type of a seesaw supported on a support means for rocking movement thereabout. The support means comprises a support shaft 7 provided on the top of a base 6. The support shaft 7 extends substantially horizontally and widthwise of the frame 3 and the container 2. The support shaft 7 is positioned intermediately of the length of the frame 3 and the container 2. Frame drive means comprises a cylinder 8 provided between and operatively connected to the base 6 and the frame 3 to rockingly move the frame 3 and the container 2 in a direction about the support shaft 7 and in the reverse direction about the support shaft 7. Accordingly, the frame 3 and the container 2 can be inclined into an oblique position with respect to a horizontal position. The oblique position is shown in solid line, the horizontal position being shown in broken line in FIG. 1. The oblique position has an angle α predetermined to 3° to 30° with respect to the horizontal position. The frame 3 and the container 2 can also be disposed in the horizontal position. The frame 3 and the container 2 can also be inclined into the reversely oblique position with respect to the horizontal position. The reversely oblique position has the same angle as the angle α with respect to the horizontal position. A program control apparatus not shown is connected to the cylinder 8 to control the same according to a predetermined program when massaging, mixing and salting the raw meat, as described below.

Figure 2:
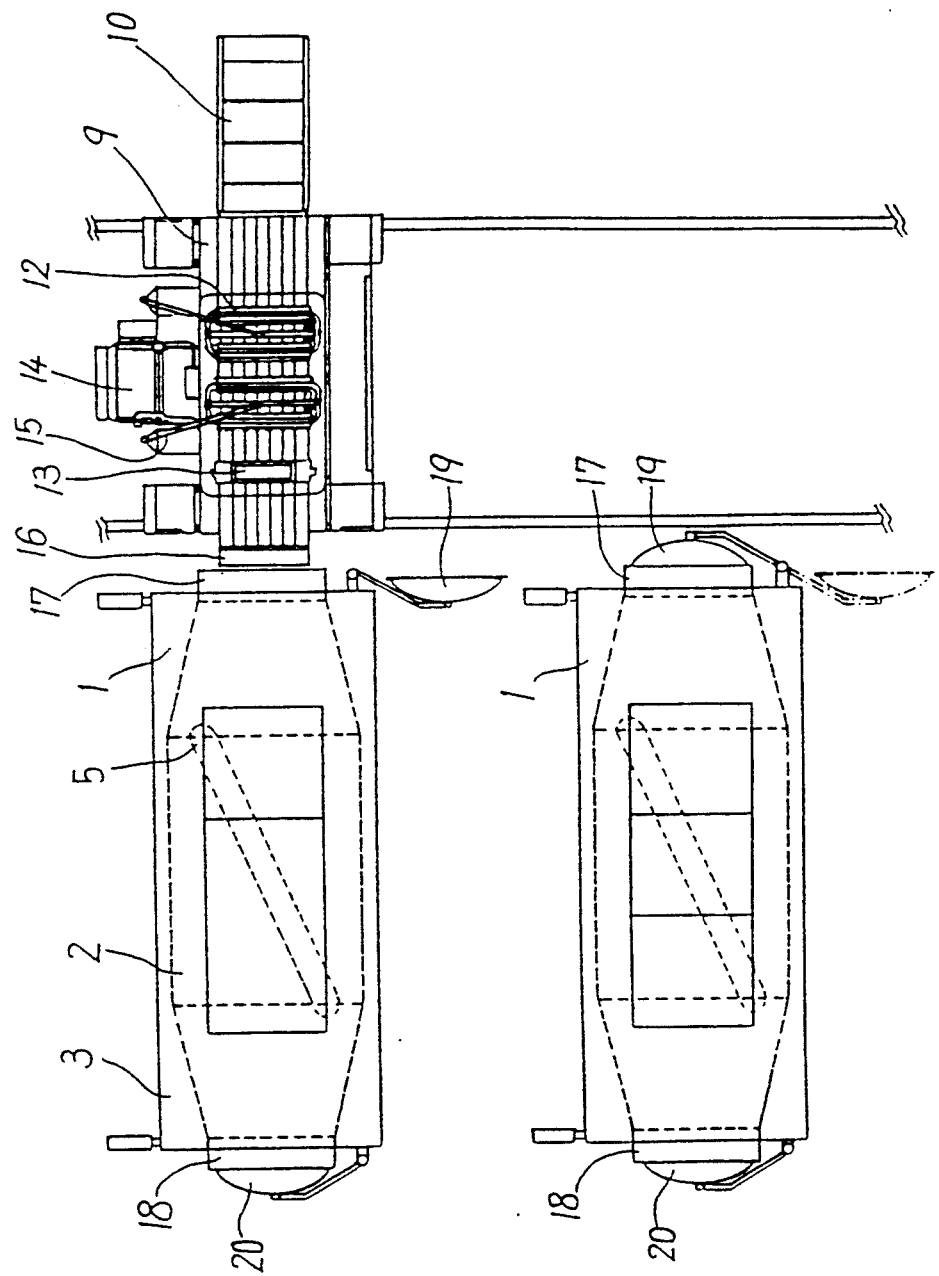
FIG. 2 is a plan view of FIG. 1 embodiment.

The container 2 is not movable but stationary, unlike the container disclosed in the above patent. In this connection, two or more massaging apparatuses 1 are combined with an injecting apparatus 9 for injecting pickle solution into the raw meat, as shown in FIG. 2. The injecting apparatus 9 includes a feed conveyor 10, the raw meat being fed by the feed conveyor 10 from the inlet end 11 thereof into the injecting apparatus 9. The injecting apparatus 9 further includes injecting needles and cutting needles disposed therein, the injecting needles being held by holders 12, the cutting needles being held by a holder 13. A tank 14 is mounted on the side wall of the injecting apparatus 9, a pickle solution being supplied from the tank 14 to the injecting needles by means of hoses 15. The raw meat is intermittently and horizontally fed in the injecting apparatus 9, the injecting needles being thrust into the raw meat for injecting the pickle solution thereinto, the cutting needles being also thrust into the raw meat for cutting the fibers of the raw meat, as disclosed in detail in U.S. Pat. No. 4,881,458. The injecting apparatus 9 further includes an outlet end 16 from which the raw meat is discharged after injecting the pickle solution and cutting the fibers of the raw meat.

The massaging apparatuses 1 extend longitudinally of the injecting apparatus 9 at a position downstream of the injecting apparatus 9, the massaging apparatuses 1 being arranged side by side widthwise thereof. The massaging apparatuses 1 are substantially identical in structure with each other. In each apparatus 1, the frame 3 includes the opposite opening ends 17 and 18 in the longitudinal direction thereof, one of the opening ends 17 comprising an inlet end adapted to receive the raw meat and direct the same into the container 2. The other opening end 18 comprises an outlet end from which the raw meat is discharged after massaging, mixing and salting the raw meat. The inlet and outlet ends 17 and 18 can be closed by covers 19 and 20. The container 2 also includes opposite opening ends in the longitudinal direction which are communicated with the inlet and outlet ends 17 and 18 respectively.

The injecting apparatus 9 is carried on a carriage 21 which includes wheels 22 mounted thereon for rotation and engaged with the guide rails 23 so that the injecting apparatus 9 is supported and guided by the guide rails 23 for movement. The guide rails 23 extend in the direction in which the massaging apparatuses 1 are arranged side by side. A motor not shown is installed in the carriage 21 and operatively connected to the wheels 22 for rotatingly drive the wheels 22. In addition, the injecting apparatus 9 includes wheels 24 mounted thereon for rotation and engaged with a floor for supporting and guiding the conveyor 10 for movement. A cylinder not shown is provided between and operatively connected to the injecting apparatus 9 and the carriage 21 to slidingly move the injecting apparatus 9 along the carriage 21 between an advanced position shown in broken line and a retracted position shown in solid line in FIG. 1.

The massaging apparatuses 1 each includes a vacuum pump and a compressor not shown, which are connected to the container 2. The vacuum pump is used to make the container 2 vacuous. The compressor is used to heighten the pressure in the container 2. The program control apparatus is connected to the vacuum pump and the compressor to control the same according to a predetermined program when massaging, mixing and salting the raw meat, as described below.

In operation, the cover 19 is opened manually or automatically at the inlet end 17 of selected one of the massaging apparatuses 1. The injecting apparatus 9 and the carriage 21 are then moved along the guide rails 23 by the motor and the wheels 22 to thereby align the outlet end 16 of the injecting apparatus 9 with the opened inlet end 17 of the selected massaging apparatus 1. The injecting apparatus 9 is then slidingly moved along the carriage 21 by the cylinder to the advanced position shown in broken line in FIG. 1 so that the outlet end 16 is inserted into the inlet end 17 of the massaging apparatus 1. The frame 3 and the container 2 is rockingly moved in a direction about the shaft 7 by the cylinder 8 so that the frame 3 and the container 2 are inclined into the oblique position shown in solid line in FIG. 1, simultaneously with the insertion of the outlet end 16. Accordingly, the raw meat is discharged from the outlet end 16 of the injecting apparatus 9 after injecting the pickle solution, and delivered onto the inlet end 17 of the selected massaging apparatus 1 to be directed into the container 2 thereof, so that the container 2 is charged with the raw meat having the pickle solution injected thereinto. The container 2 is rotated about the longitudinal axis thereof by the rollers 4 for massaging, mixing and salting the raw meat by the container 2 and the blades 5.

After charging the container 2 with the raw meat, the injecting apparatus 9 is slidingly moved along the carriage 21 by the cylinder to the retracted position shown in solid line in FIG. 1 so that the outlet end 16 is withdrawn from the inlet end 17 of the massaging apparatus 1. The cover 19 is opened at the inlet end 17 of another massaging apparatus 1. The injecting apparatus 9 and the carriage 21 are then moved along the guide rails 23 by the motor and the wheels 22 to thereby align the outlet end 16 of the injecting apparatus 9 with the opened inlet end 17 of another massaging apparatus 1. In the massaging apparatus 1 charged with the raw meat, the cover 19 is closed manually or automatically at the inlet end 17 thereof, the container 2 being kept rotating for massaging, mixing and salting the raw meat. On the other hand, in another massaging apparatus 1, the injecting apparatus 9 is then slidingly moved along the carriage 21 by the cylinder to the advanced position so that the outlet end 16 is inserted into the inlet end 17, the frame 3 and the container 2 being rockingly moved in a direction about the shaft 7 and inclined into the oblique position shown in solid line in FIG. 1. Accordingly, the raw meat is discharged from the outlet end 16 of the injecting apparatus 9 and delivered onto the inlet end 17 of another massaging apparatus 1 so that the container 2 is charged with the raw meat. In another massaging apparatus 1, the container 2 is rotated about the longitudinal axis thereof by the rollers 4 for massaging, mixing and salting the raw meat by the container 2 and the blades 5.

When massaging, mixing and salting the raw meat in each massaging apparatus 1, the cylinder 8 is controlled according to a predetermined program by the program control apparatus so that the frame 3 and the container 2 is held in the oblique position shown in solid line in FIG. 1 for a predetermined time. The cylinder 8 is then driven according to the predetermined program to rockingly move the frame 3 and the container 2 in the reverse direction about the support shaft 7 so that the frame 3 and the container 2 are inclined into the reversely oblique position. The frame 3 and the container 2 are held in the reversely oblique position for a predetermined time. The cylinder 8 is then driven according to the predetermined program to rockingly move the frame 3 in a direction about the support shaft 7 so that the container 2 are again inclined into and held in the oblique position. The cylinder 8 is then driven to rockingly move the frame 3 in the reverse direction about the support shaft 7 so that the container 2 are again inclined into and held in the reversely oblique position. The frame 3 and the container 2 can also be disposed in the horizontal position shown in broken line in FIG. 1. In addition, the vacuum pump and the compressor are controlled according to the predetermined program by the program control apparatus to make the container 2 vacuous and heighten the pressure in the container 2, alternately.

After massaging, mixing and salting the raw meat in the massaging apparatus 1, the frame 3 and the container 2 is inclined into and held in the oblique position shown in solid line in FIG. 1. The cover 20 is opened manually or automatically at the outlet end 18 of the massaging apparatus 1. The container 2 is rotated about the longitudinal axis thereof by the rollers 4 so that the raw meat is fed by the blades 5 and discharged from the outlet end 18.

Accordingly, in each massaging apparatus 1, the raw meat flows longitudinally of the container 2 whenever the container 2 is inclined into the oblique position or into the reversely oblique position. All the raw meat therefore flows and circulates in the container 2 with the rotation of the container 2. There is no stagnation of the raw meat so that all the raw meat are effectively massaged, mixed and salted, resulting in high quality of a product.

Figure 3:
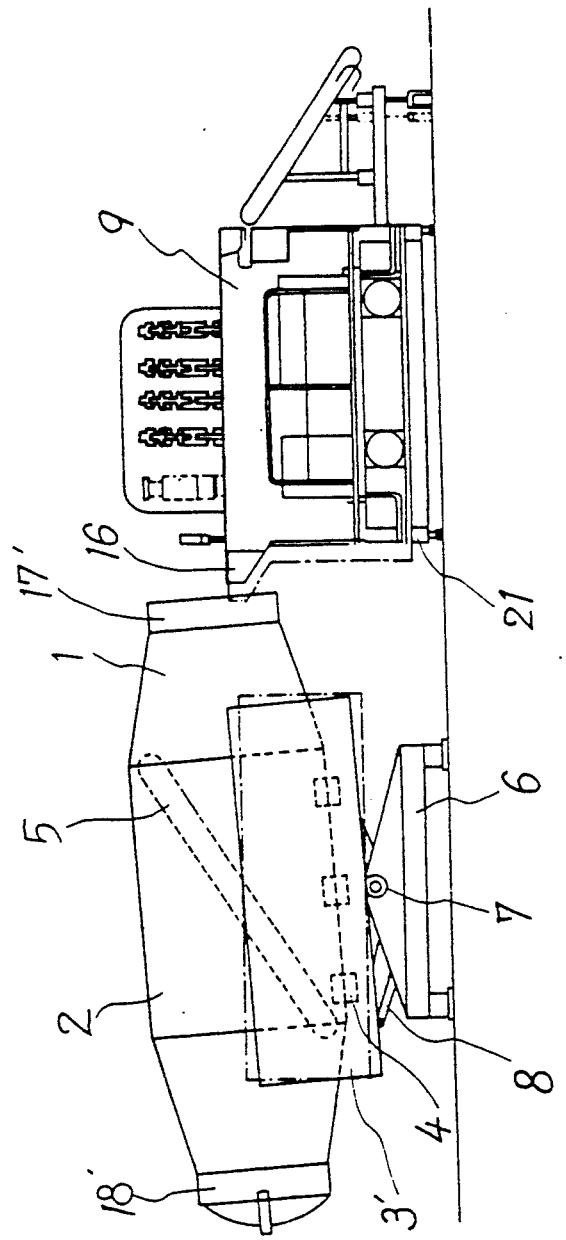
FIG. 3 is a side view of another embodiment of the invention.

Another embodiment is shown in FIG. 3, in which the rollers 4 are installed on a frame 3', the container 2 being rested on the rollers 4. The container drive means comprises a motor installed on the frame 3' and operatively connected to the rollers 4 for rotatingly driving the rollers 4 so that the container 2 is rotated by the rollers 4 about the longitudinal axis of the container 2. The container 2 includes the opposite opening ends 17' and 18' in the longitudinal direction thereof, one of the opening ends 17' comprising an inlet end adapted to receive the raw meat and direct the same into the container 2. The other opening end 18' comprises an outlet end from which the raw meat is discharged after massaging, mixing and salting the raw meat. The opening ends 17' and 18' can be closed by the covers.

What is claimed is:

1. A raw meat massaging apparatus comprising:

a rotary container for receiving raw meat having a pickle solution injected thereinto;

a frame extending longitudinally of said container, said container being supported by said frame for rotation about a longitudinal axis of the container, said frame including container drive means for rotating said container about the longitudinal axis thereof for massaging, mixing and salting the raw meat;

said frame being a seesaw supported on a support means for rocking movement thereabout, said support means extending substantially horizontally and widthwise of said frame and said container;

frame drive means operatively connected to said frame to rockingly move said frame and said container in a direction about said support means and in a reverse direction about said support means; and a program control means connected to said frame drive means for controlling said frame drive means according to a predetermined program to incline said frame and said container into an oblique position with respect to a horizontal position and then incline said frame and said container into a reversely oblique position with respect to the horizontal position when massaging, mixing and salting the raw meat.

2. A raw meat massaging apparatus as set forth in claim 1, wherein said support means is positioned substantially intermediately of the length of said frame and said container.

3. A raw meat massaging apparatus as set forth in claim 2, wherein said container includes blade means formed on the inner surface thereof, said blade means extending spirally about the longitudinal axis of said container.

4. A raw meat massaging apparatus as set forth in claim 3, wherein said frame has the shape of a hollow body including a cavity formed therein and rollers installed therein for rotation, said container being received in said cavity and rested on said rollers, said container drive means comprising a motor installed in said frame and operatively connected to said rollers for rotatingly driving said rollers so that the container is rotated about the longitudinal axis thereof by said rollers, said frame further including the opposite opening ends in the longitudinal direction thereof, one of the opening ends comprising an inlet end adapted to receive the raw meat and direct the same into said container, the other opening end comprising an outlet end from which said raw meat is discharged after massaging, mixing and salting the raw meat, said inlet and outlet ends being closed by covers, said container also including the opposite opening ends in the longitudinal direction which are communicated with said inlet and outlet ends respectively.

5. A raw meat massaging apparatus as set forth in claim 3, wherein rollers are installed on said frame for rotation, said container being rested on said rollers, said container drive means comprising a motor installed on said frame and operatively connected to said rollers for rotatingly driving said rollers so that the container is rotated about the longitudinal axis thereof by said rollers, said container including the opposite opening ends in the longitudinal direction thereof, one of the opening ends comprising an inlet end adapted to receive the raw meat and direct the same into said container, the other opening end comprising an outlet end from which said raw meat is discharged after massaging, mixing and salting the raw meat, said inlet and outlet ends being closed by covers.

* * * * *